(12) United States Patent
Feldstein et al.

(10) Patent No.: US 10,380,700 B2
(45) Date of Patent: *Aug. 13, 2019

(54) SYSTEM, METHOD AND INTERFACE FOR PRESENTING EVENT COVERAGE USING PLURAL CONCURRENT INTERFACE PORTIONS

(71) Applicant: Fox Sports Productions, Inc., Los Angeles, CA (US)

(72) Inventors: David Feldstein, Santa Monica, CA (US); Clark Pierce, Los Angeles, CA (US); Jon M. Dean, Palos Verdes Estates, CA (US)

(73) Assignee: FOX SPORTS PRODUCTIONS, LLC, Los Angeles, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/211,309

(22) Filed: Mar. 14, 2014

(65) Prior Publication Data

US 2014/0337763 A1   Nov. 13, 2014

Related U.S. Application Data

(60) Provisional application No. 61/786,995, filed on Mar. 15, 2013.

(51) Int. Cl.
*G06Q 50/00* (2012.01)
*G06F 16/957* (2019.01)
*G06F 3/0481* (2013.01)

(52) U.S. Cl.
CPC ........... *G06Q 50/01* (2013.01); *G06F 3/0481* (2013.01); *G06F 16/9577* (2019.01)

(58) Field of Classification Search
CPC .... H04L 12/1813; H04L 12/1822; H04N 7/15
See application file for complete search history.

(56) References Cited

U.S. PATENT DOCUMENTS

| | | | | |
|---|---|---|---|---|
| 6,144,375 A | * | 11/2000 | Jain | G06F 17/30017 345/420 |
| 6,795,638 B1 | * | 9/2004 | Skelley, Jr. | G11B 27/002 386/200 |
| 8,311,382 B1 | * | 11/2012 | Harwell | H04N 5/44591 386/200 |
| 8,588,944 B1 | * | 11/2013 | Scharnagle, III | G07F 17/3225 463/1 |
| 8,861,935 B2 | * | 10/2014 | Murthy | H04N 7/17318 386/278 |
| 8,863,175 B2 | * | 10/2014 | Waibel | H04N 21/435 725/34 |
| 2002/0157101 A1 | * | 10/2002 | Schrader | H04N 5/4401 725/64 |
| 2006/0253801 A1 | | 11/2006 | Okaro et al. | |

(Continued)

OTHER PUBLICATIONS

International Application No. PCT/US2014/027639 International Search Report and Written Opinion dated Sep. 1, 2014, 11 pages.

*Primary Examiner* — Nasser M Goodarzi
*Assistant Examiner* — Adil Ocak
(74) *Attorney, Agent, or Firm* — Cantor Colburn LLP

(57) ABSTRACT

A system, method and interface for presenting event coverage using plural concurrent interface portions is provided including concurrent interface portions, each interface portion including different classes of event information.

30 Claims, 16 Drawing Sheets

(56) References Cited

U.S. PATENT DOCUMENTS

| | | |
|---|---|---|
| 2007/0101394 A1* | 5/2007 | Fu .................. G11B 27/105 |
| | | 725/134 |
| 2007/0130537 A1 | 6/2007 | Chiu |
| 2009/0170603 A1 | 7/2009 | Chittoor et al. |
| 2011/0154223 A1 | 6/2011 | Whitnah et al. |
| 2011/0167376 A1 | 7/2011 | Sauve et al. |
| 2011/0238853 A1* | 9/2011 | Paul ............... H04N 21/4307 |
| | | 709/231 |
| 2013/0285937 A1* | 10/2013 | Billings ............ H04L 51/32 |
| | | 345/173 |
| 2015/0358680 A1 | 12/2015 | Feldstein et al. |

* cited by examiner

EXPANDED STATS

BASEBALL-GRAPHIC VIEW
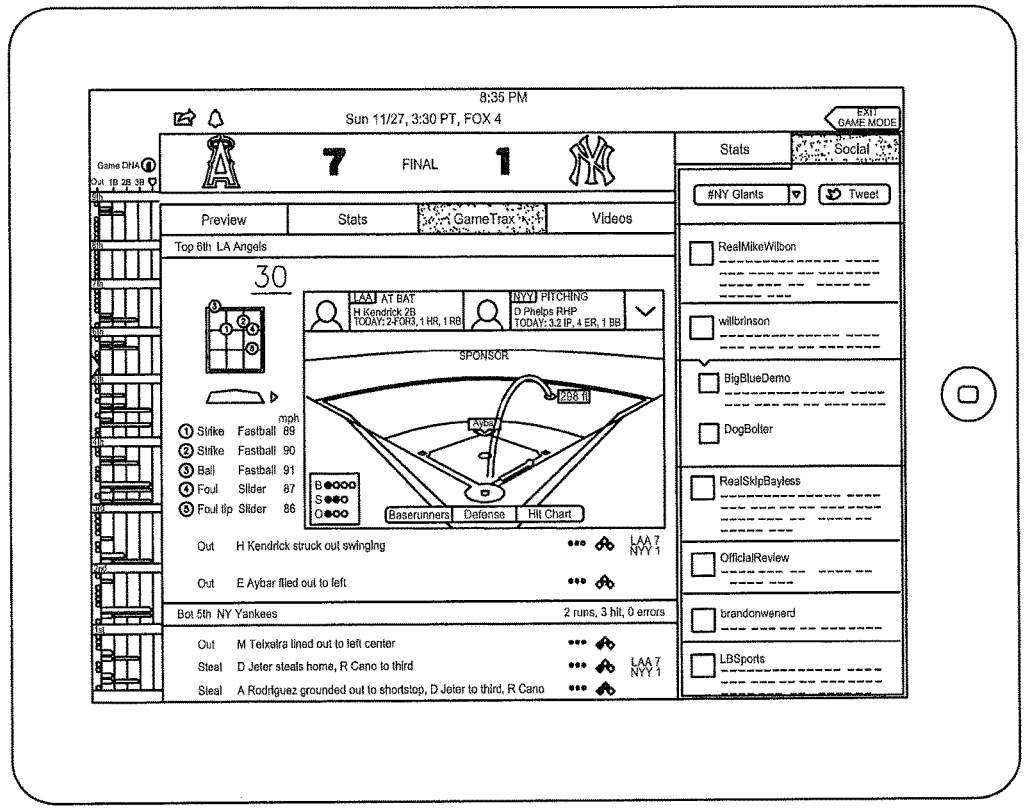
FIG. 5A
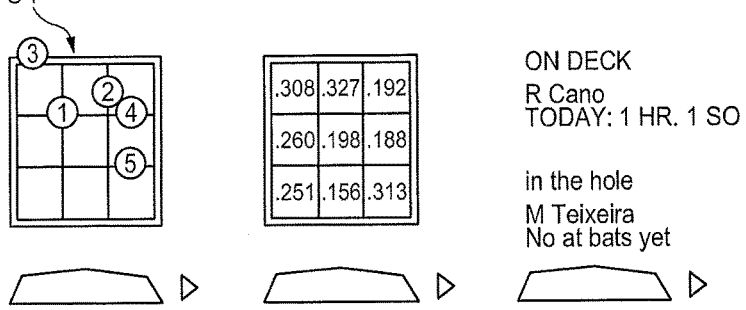
FIG. 5B
FIG. 5C

SYSTEM, METHOD AND INTERFACE FOR PRESENTING EVENT COVERAGE USING PLURAL CONCURRENT INTERFACE PORTIONS

CROSS-REFERENCE TO RELATED APPLICATIONS

This application claims the benefit of U.S. provisional patent application Ser. No. 61/786,995 filed Mar. 15, 2013, the entire contents of which are incorporated herein by reference.

TECHNICAL FIELD

The present invention is generally related to interfaces for presenting information relevant to events. More particularly, example embodiments of the present invention are related to systems, methods and interfaces for presenting event coverage using plural concurrent interface portions.

BACKGROUND OF THE INVENTION

Conventional techniques for presenting event coverage on a device, e.g., a computer, tablet or mobile device, provide limited amounts of information via a single display interface. Such information for an example dealing with a sporting event may include a single display showing a play-by-play and/or team scores.

What is needed in the art is a mechanism that provides further information about an event on concurrent interface portions in a rich way.

SUMMARY OF THE INVENTION

The present system, method and interface for presenting event coverage using plural concurrent interface portions overcomes and alleviates the needs of the prior art by presenting concurrent interface portions, each interface portion including different classes of event information.

In one exemplary embodiment, a user display includes two or more of: a statistics or social media interface portion; a score interface portion; an event tracking interface portion; and a high-level chronology-based interface portion.

In exemplary embodiments a statistics or social media interface portion is configured to alternately provide access to relevant statistics for the event and access to aggregated social media streams pertaining to the event. In certain exemplary embodiments, the user interface provides tabs or other selectable operators allowing a user to switch viewing modes. With regard to social media streams, exemplary embodiments permit a user to select relevant social media sources and/or to post comments within one or more streams.

In other exemplary embodiments, an exemplary score interface portion is configured to provide relevant status information for the event, including but not limited to, in the case of a game, event timing, inning indicator, teams or combatants and scoring, among others.

In other exemplary embodiments, an event tracking interface portion is configured to provide visualization of the event's discrete occurrences. This visualization may be text-based (e.g., sequential recitation of occurrences, such as at-bat events in baseball), image-based (e.g., a depiction of players on a field) and/or animated (e.g., a depiction of a ball being hit into a portion of the outfield with animated players moving between bases).

In exemplary embodiments, an event tracking interface is configured to provide a user the ability to move in a bi-directional way through a time sequence of occurrences. Such occurrences may be updated in any convenient way, e.g., introduction at the bottom of a text-listing of occurrences, animation on a graphic in general or in a prescribed way (e.g., scrolling or pushing football plays across a football field each play to create a three dimensional representation of sequential plays on a field).

In other exemplary embodiments, a high-level chronology-based interface portion (referred to below as a "DNA" interface portion) represents a higher level (with concomitant decrease in initially presented detail) of all or a subset of discrete occurrences of the event to date.

In other exemplary embodiments, a tab or other selectable operator is configured to turn on or off one or more of the plural interface portions. For example, a tab may provide for an event-tracking mode, which provides a score interface portion and an event tracking interface portion. The same or a different tab may provide for an overall event mode, wherein the statistics or social media interface portion and/or the DNA interface portion is additionally presented. In such a way, additional interface portions may be added to the display, providing discrete event modes with varying levels of presented detail and features.

Other exemplary embodiments provide for other rich features, including rich animations, definitions of terms, officiating rules and/or historical video for custom topics, user requested topics, etc. Additionally, exemplary embodiments provide a 'companion' mode with, e.g., alternate camera angles, replay feeds, social media components, fantasy sport components, etc.

In exemplary embodiments, the system may be configured such that a producer creates a live experience contemporaneously with the event. Additionally, occurrences and topics from the game may automatically trigger suggestions of relevant data and media to a producer (e.g., at a producer dashboard), allowing the producer to review and publish such content as desired.

Other exemplary embodiments provide a sporting event interface, with a representation of the last n games (e.g., 10 games) graphically within a standings table, allowing views of the result of each game, whether home or away, along with temporal interrelationships.

Other exemplary embodiments provide a sporting event interface, with a selectable button within standings listings that yields a graphical display of each team's cumulative record, represented as games above or below "0.500." In exemplary embodiments, this graph can provide temporality to a season-long race between two teams.

The above and other exemplary embodiments will be discussed in more detail below in the detailed description of the invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. In the FIGURES:

FIG. 5A is another illustration of an exemplary viewer display including plural concurrent interface portions;

FIG. 5B illustrates in closer detail an aspect, which shows a direction and depth of a hit in baseball, as well as progression of players around bases, of the exemplary viewer display of FIG. 5A;

FIG. 5C illustrates in closer detail an aspect, relating to a scrolling pitching area, of the exemplary viewer display of FIG. 5A;

DETAILED DESCRIPTION OF THE INVENTION

Further to the brief description provided above and associated textual detail of each of the FIGURES, the following description provides additional details of example embodiments of the present invention. It should be understood, however, that there is no intent to limit example embodiments to the particular forms and particular details disclosed, but to the contrary, example embodiments are to cover all modifications, equivalents, and alternatives falling within the scope of example embodiments and claims. Like numbers refer to like elements throughout the description of the FIGURES.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGURES. For example, two FIGURES shown in succession, or steps illustrated within any given FIGURE, may in fact be executed substantially concurrently or may sometimes be executed in the reverse order, depending upon the functionality/acts involved.

Hereinafter, exemplary embodiments of the present invention are described in detail.

As we noted above, the present invention relates to a system, method and/or interface for presenting event coverage using plural concurrent interface portions overcomes and alleviates the needs of the prior art by presenting concurrent interface portions, each interface portion including different classes of event information.

In one exemplary embodiment, a user display includes two or more of a statistics or social media interface portion; a score interface portion; an event tracking interface portion; and a high-level chronology-based interface portion.

Figure 1A:
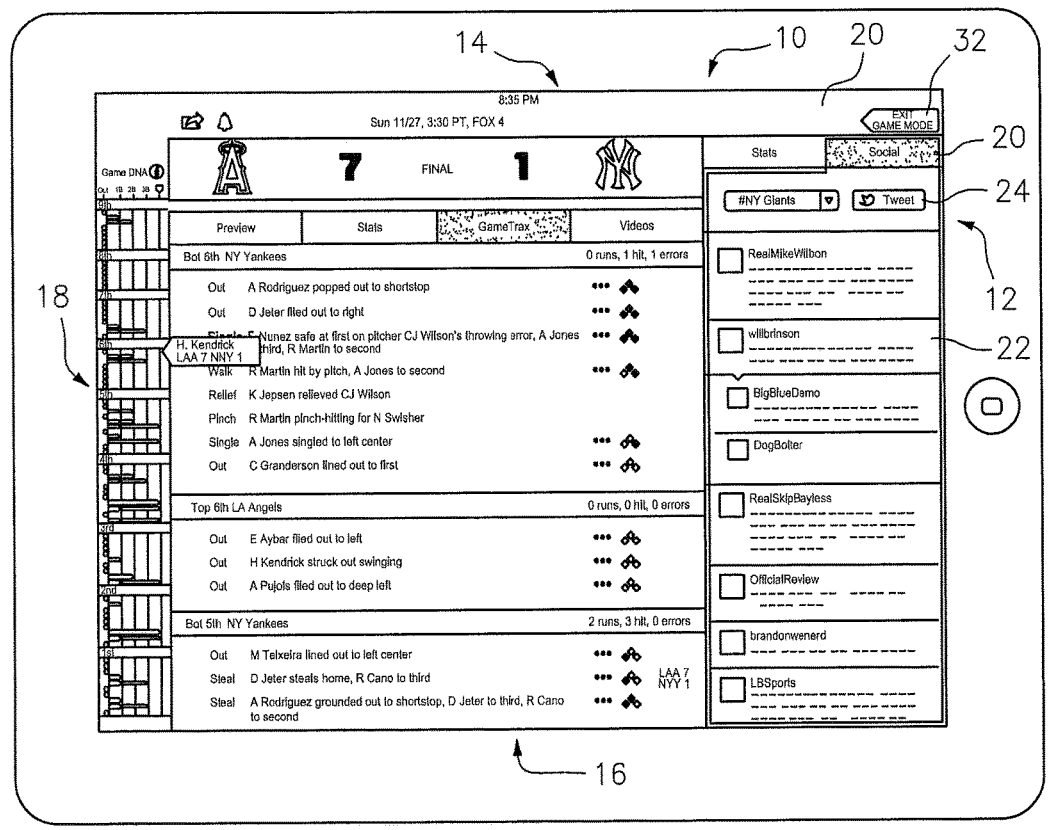
FIG. 1A is an illustration of an exemplary viewer display including plural concurrent interface portions.

Reference is made to FIG. 1A, which illustrates an exemplary tablet display generally at 10. The display includes a statistics and social media interface portion, shown generally at 12 on the right side of the display. The display 10 also includes a score interface portion, shown generally at 14 in the upper central position of the display. An event tracking interface portion is shown generally at 16 in a central and lower portion of the tablet display 10. A high-level chronology-based ("DNA") interface portion is shown generally at 18 on the left hand side of the display 10.

Figure 1B:
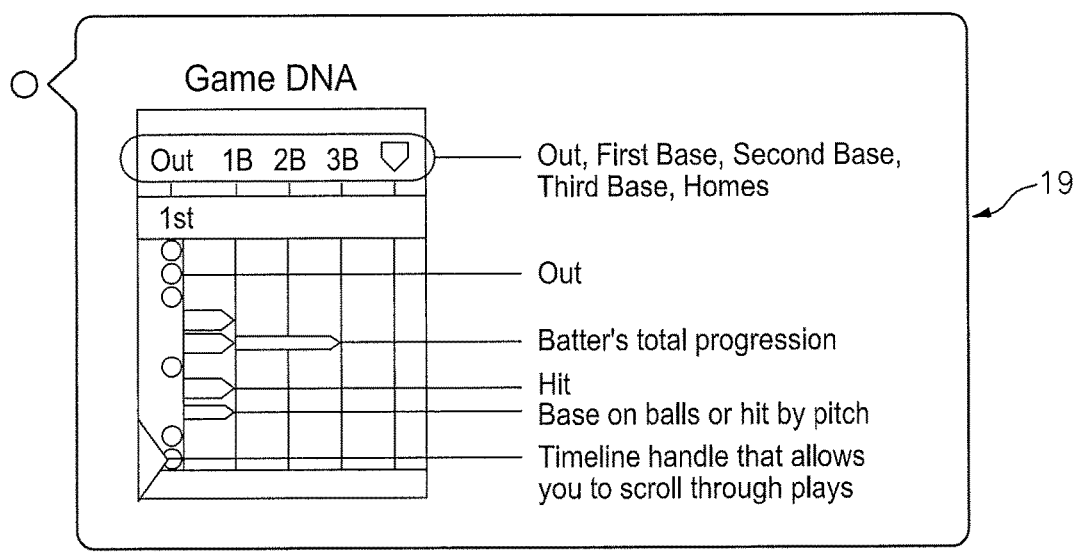
FIG. 1B is an illustration of an information display from the viewer of FIG. 1A.
Figure 2:
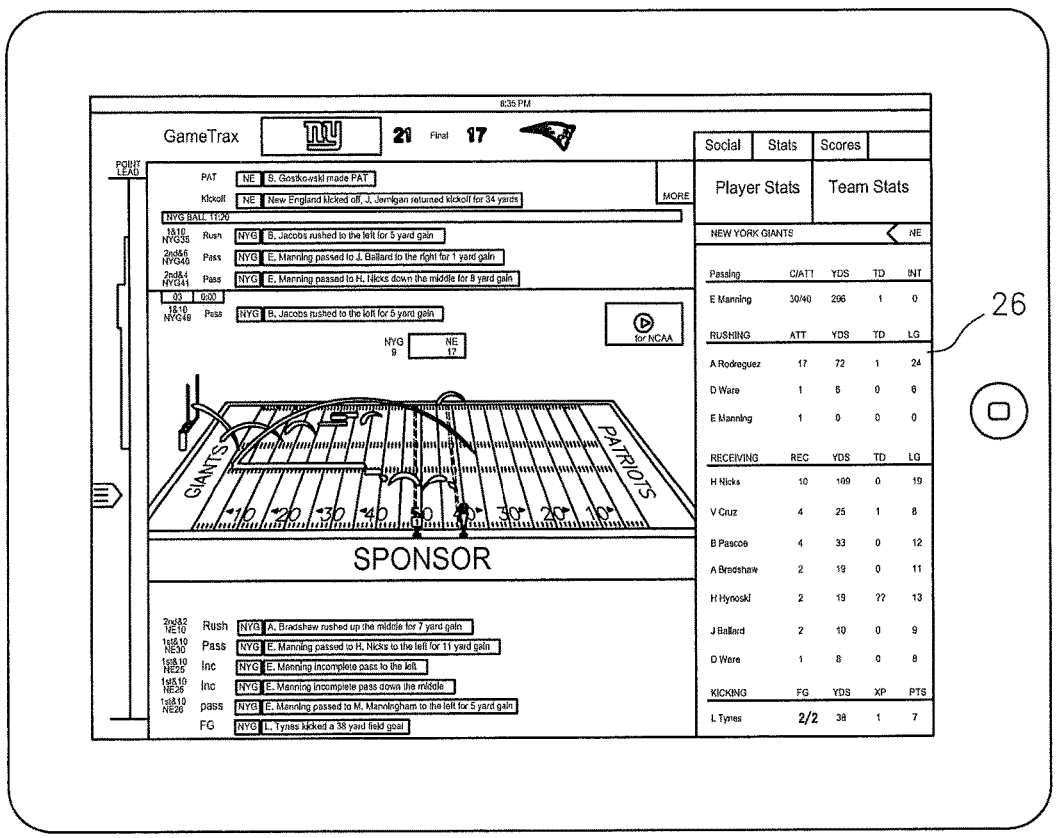
FIG. 2 is another illustration of an exemplary viewer display including plural concurrent interface portions.
Figure 3:
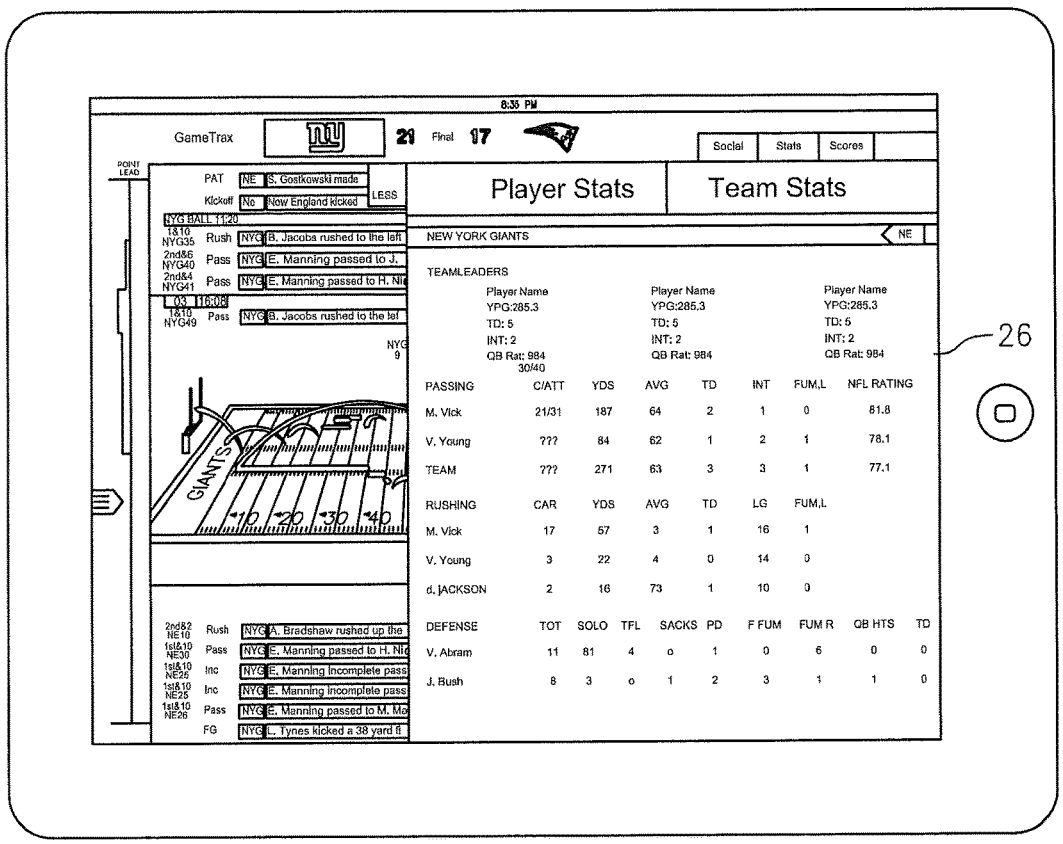
FIG. 3 is another illustration of an exemplary viewer display including plural concurrent interface portions.

Referring still to FIG. 1A, an exemplary embodiments a statistics or social media interface portion 12 is configured to alternately provide access to relevant statistics for the event and access to aggregated social media streams pertaining to the event. In certain exemplary embodiments, the user interface provides tabs or other selectable operators 20 allowing a user to switch viewing modes. With regard to social media streams 22 in FIG. 1A, exemplary embodiments permit a user to select relevant social media sources and/or to post comments within one or more streams (e.g., at 24 in FIG. 1). An exemplary statistics field is illustrated at 26 in FIG. 2, with an expanded statistics field illustrated in FIG. 3.

Referring again to FIG. 1A, in other exemplary embodiments, an exemplary score interface portion 14 is configured to provide relevant status information for the event, including but not limited to, in the case of a game, event timing, inning indicator, teams or combatants and scoring, among others. Additionally, score related information may appear in other interfaces as well, e.g., in interface 12 (a scores tab and information is illustrated generally at 28 in FIG. 4.

Figure 4:
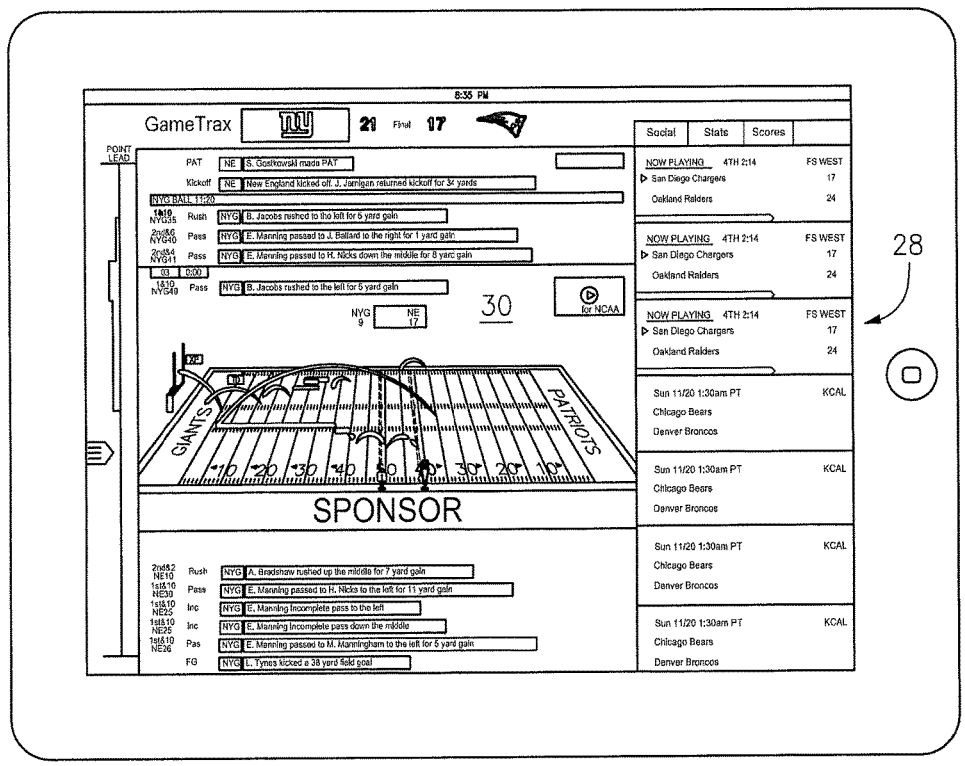
FIG. 4 is another illustration of an exemplary viewer display including plural concurrent interface portions.

Referring again to FIG. 1A, in other exemplary embodiments, an event tracking interface portion 16 is configured to provide visualization of the event's discrete occurrences. This visualization may be text-based (e.g., sequential recitation of occurrences, such as at-bat events in baseball as in FIG. 1A), image-based (e.g., a depiction of players on a field) and/or animated (e.g., a depiction of a ball being hit into a portion of the outfield with animated players moving between bases). FIG. 4 illustrates a visual representation 30 that spatially shows on a football field sequential plays and results. FIG. 5A illustrates another visual representation 30 that shows a direction and depth of a hit in baseball, as well as progression of players around bases.

In exemplary embodiments, an event-tracking interface is configured to provide a user the ability to move in a bi-directional way through a time sequence of occurrences. Such occurrences may be updated in any convenient way, e.g., introduction at the bottom of a text-listing of occurrences, animation on a graphic in general or in a prescribed way (e.g., scrolling or pushing football plays across a football field each play to create a three dimensional representation of sequential plays on a field (with, in exemplary embodiments, concurrent showing of scores reflected by the timeline)), as above with regard to FIGS. 4 and 5A.

In addition, exemplary FIG. 5A provides additional interactive features, e.g., selection, such as mouse selection, tapping, etc., of the "strike zone" 31 in FIG. 5A may be configured to cycle between different screens, e.g., switching between "pitches", "hot/cool" and "on deck/in the hole", as in FIG. 5B. In other exemplary embodiments, "on deck/in the hole" will automatically show itself at the end of a play, followed by a switch back to "pitches."

In other exemplary embodiments, the "pitching area", shown generally at 33, becomes scrollable when no more lines can fit, e.g., as in FIG. 5C.

Referring again to FIG. 1A, in other exemplary embodiments, a high-level chronology-based interface portion (a "DNA" interface portion) 18 represents a higher level (with concomitant decrease in initially presented detail) of all or a subset of discrete occurrences of the event to date. Exemplary embodiments provide the DNA interface portion with a chronology of constituent occurrences within the event, using a graphical or symbolic language to do so. As such, the DNA interface portion communicates visually elements of the event at a glance. Exemplary embodiments also permit sliding of the visual display to move along a timeline represented in the display, allowing a user to change the display of the central area to represent a desired constituent occurrence in the timeline.

DNA Interface Examples

1. MLB Game DNA

MLB Game DNA represents a completely new visualization and symbology to describe the events of a baseball game. FIG. 1A illustrates an exemplary MLB Game DNA at 18.
  1. MLB Game DNA provides a chronology of each At Bat in a baseball game.
  2. At-Bats form the vertical axis of the area, in reverse chronological order (or some other chronological order).
  3. Each vertical area indicates both the result of the at-bat and, if the player At Bat reached base, how far he advanced.
  4. The result of the At Bat is represented by a saturated color bar; any progress that player made on subsequent plays is represented by a desaturated color bar.
  5. Lines are color-coded by team, and divided by inning headers
  6. The "i" icon next to the title of the area provides detailed information (see FIG. 1B generally at 19) as to the graphical representation below, e.g., Out, 1B, 2B, 3B Home indicators, out indicators, batter's total progression bars, hit indicator bars, base on balls or hit by pitch bars, or timeline handle (allows a user to scroll through plays).
  7. When the user presses anywhere on the timeline, a magnifying panel appears, which displays the hitter at that time, and the score at that point in the game. The Focus Area displays the play corresponding to that point on the timeline.

2. UFC Fight DNA

Figure 6:
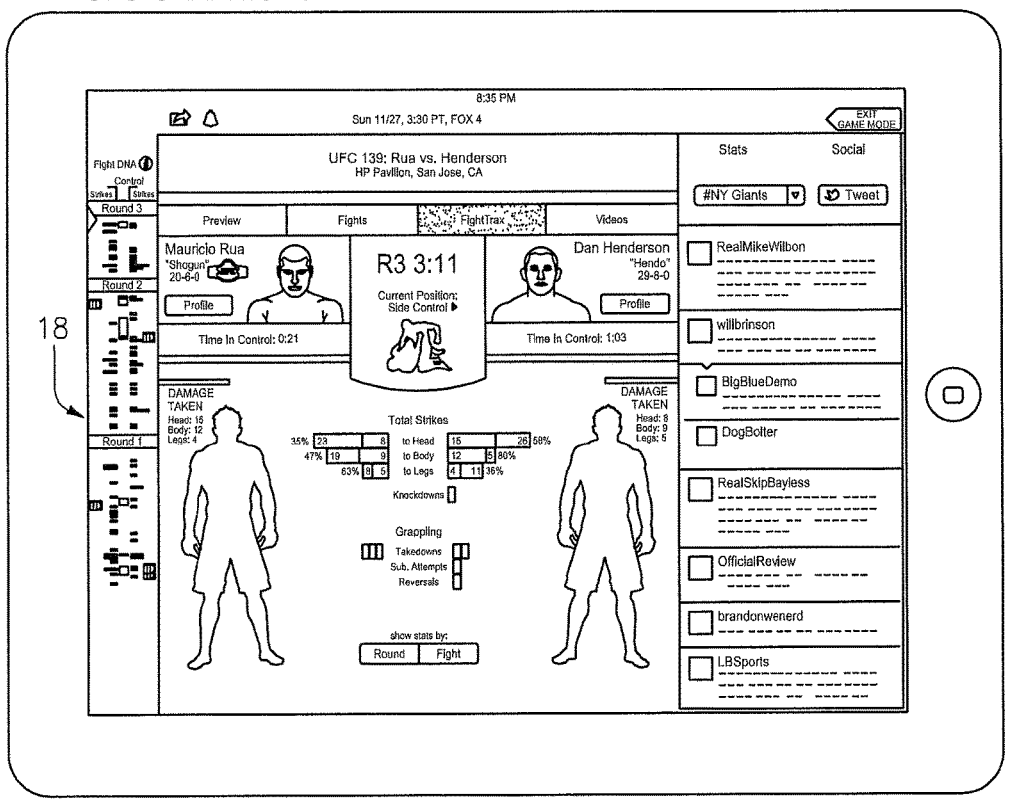
FIG. 6 is another illustration of an exemplary viewer display including plural concurrent interface portions.

UFC DNA represents a completely new visualization and symbology to describe the events of a UFC (Ultimate Fighting Championship Bout). These techniques also apply to any MMA (Mixed Martial Arts) contest, or with little alteration any martial arts event, wrestling match, or boxing match. FIG. 6 illustrates an exemplary UFC DNA interface portion at 18.
  1. Time slices of the fight are sliced into 5 seconds and form the vertical axis of the area, in reverse chronological order. Lines are color-coded by fighter, and divided by Rounds.
  2. Running down the center of the axis is a column that provides a color-coded indication on the timeline of when one fighter has control of the other.
  3. On either side of this center column, the horizontal lines indicate strikes each fighter attempted in each time slice; the longer the line, the greater the number of strikes in that time slice. The line is divided into thirds, 1 hit, 2 hits, and 3+ hits within 5 seconds.
  4. Also indicated on the edges of the timeline in lettered tags are Takedowns, Knockdowns, and Submission Attempts.
  5. The "i" icon next to the title of the area provides detailed information as to a graphical representation.
  6. When the user presses anywhere on the timeline, a magnifying panel appears, which displays the round, time, and control position at that point in the timeline. All data displayed in the FightTrax Main Area corresponds to that point in the Fight.

Figure 13:
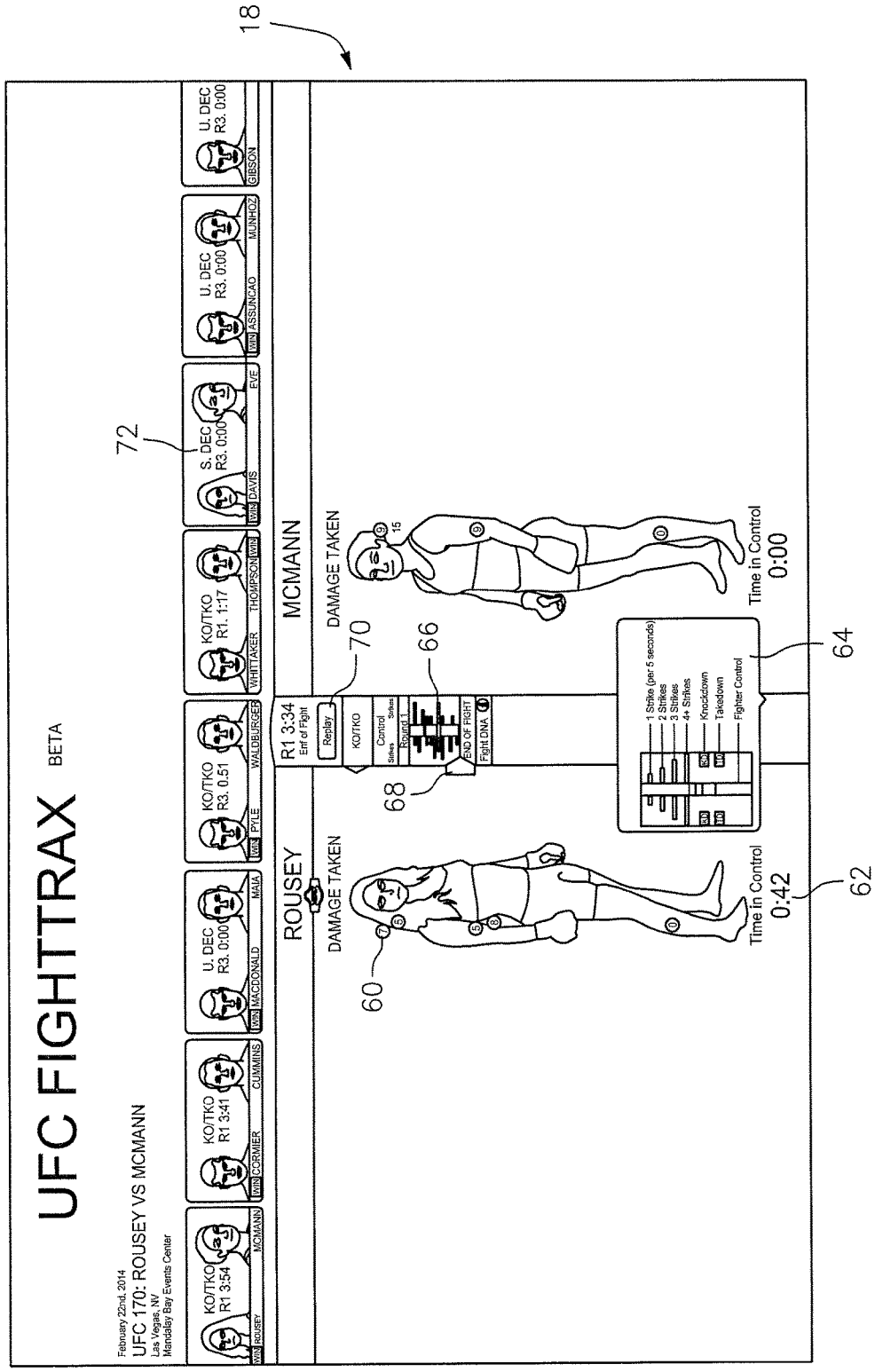
FIG. 13 another illustration of an exemplary viewer display including plural concurrent interface portions.

FIG. 13 illustrates above points with another exemplary interface portion 18. This exemplary interface includes: indication of damage taken (with color/size/number differentiation for increased number of hits or damage) 60; indications of "Time in Control" 62; DNA popups and on-screen indicators 64, 66; scrolling time/event bar 68; replay button 70; and fight selector 72.

Figure 14:
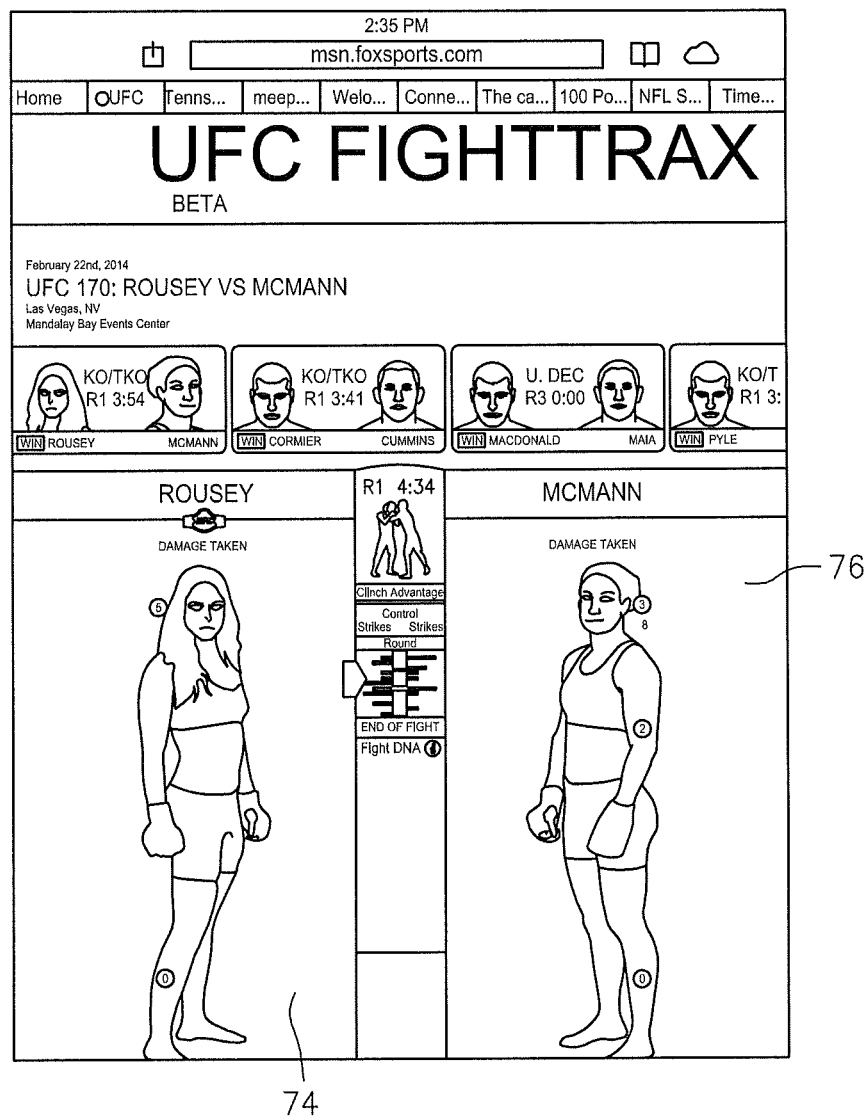
FIG. 14 another illustration of an exemplary viewer display including plural concurrent interface portions.

FIG. 14 shows an exemplary online interface with similar elements, which also illustrates indications of activity (in this case, a blow to the abs of a particular intensity) 74. This exemplary screenshot also shows positional information, advantages, etc. at 76 (note, recited features are not interface specific, but may appear on any interface).

Figure 15:
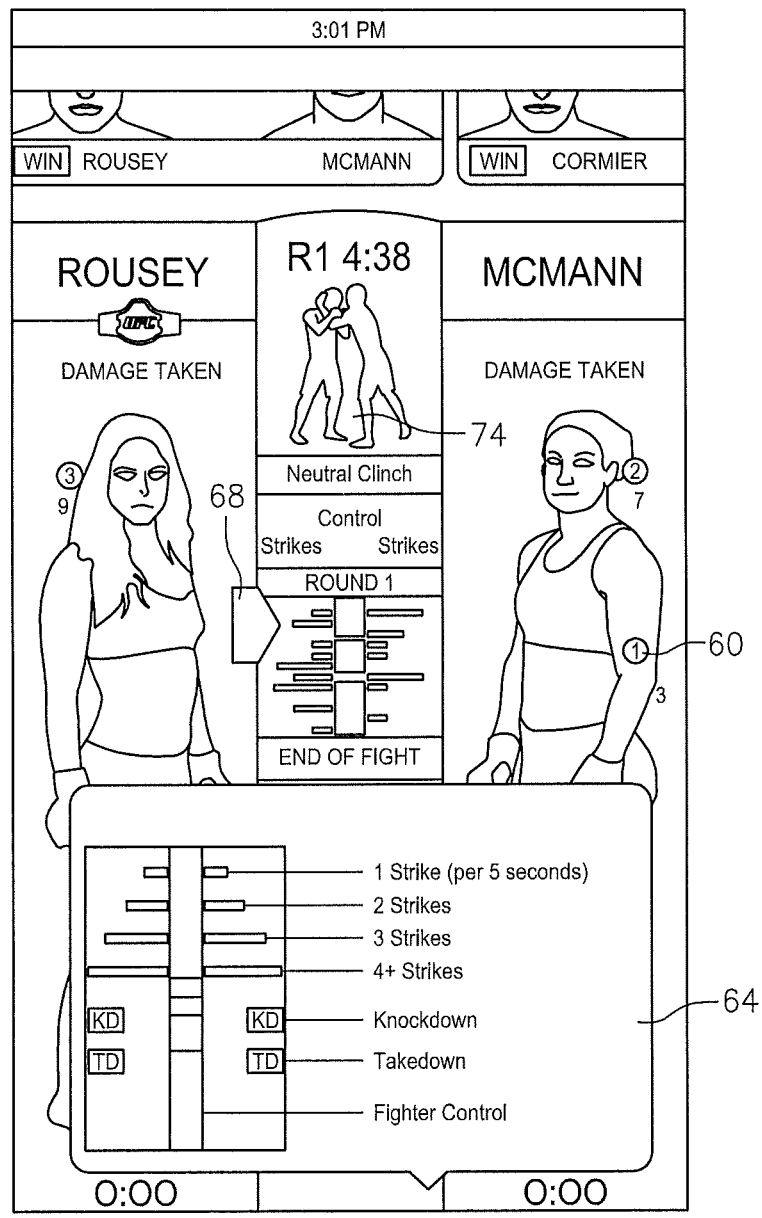
FIG. 15 another illustration of an exemplary viewer display including plural concurrent interface portions.

FIG. 15 shows a similar interface, with fight DNA popup 64, activity indicator 74; scrolling time/event bar 68, indication of damage taken (with color/size/number differentiation for increased number of hits or damage) 60, etc.

Other non-limiting examples with plural concurrent interface portions are described below specific to certain sports:

Other Examples

3. Football

Event Tracking Interface Portion

The central area consists of a list of preceding plays at bottom and a central "Focus Area" that presents a graphical representation of plays above that.

The Focus Area is open by default. In can be closed by selecting the icon at the upper right of the area, and reopened by selecting any of the play-by-play descriptions.

The major component of the Focus Area is a football field graphic

Plays appear in real-time on the field, color-coded by team.

Different play types (e.g., complete pass, incomplete pass, interception, run) will each have a unique graphical representation There is a limit to the number of plays graphically represented. After this limit is reached and a new play occurs, the graphical representation of the oldest of the plays disappears.

The current play's description appears just below football field, with down-and-distance, yard-line, scoring-play-type, and resultant score data appearing as appropriate Each play appears at the same point on the field; when a new play appears, the preceding play's description moves below the Focus Area, and the graphical representations of plays on the football field moves up (i.e., along the z-axis, retreating into the distance).

Headers divide one possession from another.

When the user employs the Point Lead slider to bring previous (i.e., non-current/live plays) into the Focus Area, additional element(s) appear Above the football field is a "FOX Box" that displays the period, time, score and timeouts remaining for each team. Note that this information pertains to the status of these data points immediately before the play currently displayed in the Focus Area. The header at the top of the screen, on the other hand, always shows the current, live status of these data points.

In addition, when and if individual play video highlights become available and a previous play appears in the Focus Area for which such a highlight is available, a thumbnail will appear next to the FOX Box. Selecting the thumbnail will cause the video highlight to play, after which the user will be returned to the event tracking portion.

Point Lead (Game DNA)

Time forms the vertical axis of the area. Point differential is provided by the horizontal axis, in reverse chronological order.

Color-coded blocks indicate the point differential during each time segment of the game.

When the user presses anywhere on the timeline, a magnifying panel appears, which displays the down-and-distance and yard-line for the next play corresponding to that point on the timeline. The Focus Area displays the next play corresponding to that point on the timeline.

Stats

When the Stats tab is selected in the Social/Stats modal at right, two subheaders appear, "Team Stats" and "Player Stats." The highlight will default to the first subhead the first time in, and subsequently to the last-highlighted subhead.

Team Stats displays the linescore (score by period) for the game at the top. The linescore will include any overtime(s), including multiple overtimes for NCAA Football and for NFL playoffs.

Below the linescore, a color-coded selector displays labels for the two teams, the visiting team to the left and the home team to the right. The selector will default to the visiting team the first time in, and subsequently to the last-selected team.

Beneath the team selector team stats appear. The team selector allows the user to easily toggle between the teams to compare them in the various statistics provided.

The Player Stats subheader provides similar functionality. The team selector is repeated, and beneath it appear statistics related to each category: Rushing, Receiving, Kicking, Punting, Kick Returns, Punt Returns, Interceptions, Fumbles, and Defense (which may be renamed "Tackles" to prevent confusion). Each section has separate column headers, then lists all players with qualifying statistics in that category.

4. Baseball

Event Tracking Interface Portion

The central area consists of a list of preceding plays at bottom and a central "Focus Area" that presents graphical representations of field state, pitches and plays.

The Focus Area is open by default. It can be closed by selecting the icon at the upper right of the area, and reopened by selecting any of the play-by-play descriptions.

There are two major components of the Focus Area: a larger, "Baseball Diamond" graphic to the right with current hitter/pitcher displayed above it, and a smaller, "Pitch Detail" Area to the left.

The current play's description appears just below the baseball diamond and Pitch Detail Area, with play type, and description.

When a new play appears, the preceding play's description moves below the Focus Area, and additional information appears to the right: the resultant number of outs, men on base, and score (if changed).

Headers divide Top and Bottom of Innings

Current Hitter/Pitcher Display

Headshots of the current hitter and pitcher appear, along with names, stats and positions Relevant statistics appear and change periodically (timing TBD), providing different, relevant statistics for both the hitter and pitcher.

An "expand down" icon appears at far right. When selected, additional statistical information appears. This data includes for the hitter historical head-to-head information for the hitter against the current pitcher, and cumulative season and career stats. For the pitcher, it includes the pitcher's cumulative game stats, and season and career stats.

Baseball Diamond

The field dimensions of each MLB park will be accurately represented.

Graphical plays appear in real-time on the field.

Pitches will be animated.

Different play types (e.g., ground balls, fly outs, pop outs, line drives) will each have a unique graphical animation.

Baserunners' presence and movement along the basepaths will also be represented graphically.

When a lineup change is made, the Diamond is removed and data displaying the player being removed and those of the player being inserted appears for a few seconds before the Diamond reappears. In the event of multiple lineup changes occurring currently, each will be displayed for a few seconds before the Diamond reappears.

At bottom left, current Balls, Strikes, and Outs are indicated.

At bottom center, three buttons allow the user to select between various display modes for the Baseball Diamond. "Baserunners" is the first button and default on entry. Its features are described above, in items [0090]-[0093]. Two additional buttons provide non-animated views: "Defense" provides the names of all players currently in the field, and "Hit Chart" provides the current batter's hits/outs distribution for the current season.

When the user employs the Game DNA slider to bring previous (i.e., non-current/live plays) into the Focus Area, and unlike Football, additional elements appear:

The play-by-play description in the Focus Area must be augmented at far right with the score that resulted from that At-Bat appearing.

The Current Hitter/Pitcher display will not rotate through stats in this state; the first permutation will be shown persistently.

Pitch Detail Area

There are two elements, a graphical depiction of the plate and, below it, a description of each pitch.

The area above the plate is gridded and color-coded, providing an indication of the comparative value of the current hitter's average in each square of the grid.

After an out is made other than the third out of the inning, the grid disappears to show the hitter On Deck and In the Hole, with their game stat lines, in this area for a couple of seconds before displaying the grid again for the upcoming hitter.

Tapping the grid displays the hitter's averages pertaining to balls pitched to each area.

Tapping again removes the grid and displays the hitter currently On Deck and In the Hole, with their stat lines.

Tapping once more displays the current hitter's grid.

As pitches are delivered, a colored circle indicates the location of each pitch.

Pitches are color-coded by whether strike, ball, foul, or hit ball. Pitches are also numbered in sequence for the at-bat.

Next to the plate, a small arrow indicates whether the current hitter is lefty or righty.

Below the plate, a list of pitches appear, indicating the batter's action on the pitch, type of pitch, and speed.

Game DNA

At-Bats form the vertical axis of the area, in reverse chronological order. Each vertical area indicates both the result of the at-bat and, if he reached base, how far he advanced. Lines are color-coded by team, and divided by inning headers.

The "i" icon next to the title of the area provides detailed information as to the graphical representation below.

When the user presses anywhere on the timeline, a magnifying panel appears, which displays the hitter at that time, and the score at that point in the game. The Focus Area displays the play corresponding to that point on the timeline.

Stats

When the Stats tab is selected, the linescore appears at the top. The linescore will include the last innings if extra innings were played, and will be swipable to see earlier innings Below the linescore, a color-coded selector displays labels for the two teams, the visiting team to the left and the home team to the right. The selector will default to the visiting team the first time in, and subsequently to the last-selected team.

Beneath the team selector stats appear for both the lineup (batters) and pitches who are in the starting lineup or who have entered the game.

The team selector allows the user to easily toggle between the teams to compare them in the various statistics provided.

5. UFC

Differences from Baseball

Due to the distinctly different nature of UFC as opposed to conventional team sports, UFC event tracking differs from other sports in three exemplary ways:

First, the UFC Area is persistent, registering second-by-second fight data but also showing cumulative stats. There is no Play-by-Play or Focus Area that can be opened or closed in UFC.

Second, the Fight DNA area is more dynamic in that it can be updated approximately every 5 or 10 seconds, and a result garner a significantly-greater share of user attention.

Third, because each UFC "Event" actually consists of a number of different fights, a means was needed to allow users to see the event's Fight Card, and to choose to see UFC data for preceding Fights on the card. The Social/Stats Mode may be employed to provide this functionality.

UFC Event Tracking Area

At the Top of the UFC area, the two fighters appear, with headshots, nicknames, and MMA records. A Round/Clock, Current Position, and Control indicator appears between them.

A "Profile" button appears beneath each fighter. When selected, a modal appears for that fighter. Physical data for the fighters, biographical information, a graphic representation of the MMA tendencies, and a summary of the fighter's skills appears.

While one fighter's Profile is onscreen, users can select the other and the first remains onscreen.

During the fight, the total time during which each fighter had the other In Control appears beneath the Profile button.

The Control Indicator provides a clock representing the cumulative time each fighter has the other "in control."

Beneath this top set of information are graphical representations of both fighters. Between them are color-coded bar charts indicating strikes attempted to various parts of the body, and those that landed; knockdowns, takedown attempts and successful takedowns; and reversals.

As strikes are attempted and land, animations indicate them on the fighter graphics. Strikes landed accumulate and progressively saturate the area of the fighter receiving strikes.

Between the fighter graphics and header information is summary statistics for damage taken by each fighter.

At the bottom center is a selector that allows users to choose between showing data for the current round or the entire fight. The default is "Round" upon entry, but once the user has changed the selector, the last selection is the default upon reentry.

Fight DNA

Time slices of the fight are sliced into 5 seconds and form the vertical axis of the area, in reverse chronological order. Lines are color-coded by fighter, and divided by Rounds.

Running down the center of the axis is a column that provides a color-coded indication on the timeline of when one fighter has control of the other.

On either side of this center column, the horizontal lines indicate strikes each fighter attempted in each time slice; the longer the line, the greater the number of strikes in that time slice. The line is divided into thirds, 1 hit, 2 hits, and 3+ hits within 5 seconds.

Also indicated on the edges of the timeline in lettered tags are Takedowns, Knockdowns, and Submission Attempts.

The "i" icon next to the title of the area provides detailed information as to the graphical representation below.

When the user presses anywhere on the timeline, a magnifying panel appears, which displays the round, time, and control position at that point in the timeline. All data displayed in the UFC Main Area corresponds to that point in the Fight.

Stats

When the Stats tab is selected, side-by-side stats appear for each of the fighters.

Stats include Knockdowns; Significant Strikes landed, Significant Strikes Attempted, Significant Strikes Landed Percentage; Total Strikes and Strikes Attempted; Takedowns, Takedown Attempts, and Takedown Percentage; Submission Attempts; Passes; and Reversals The same data set is presented for each round, with a header above each At the bottom, another header indicates that below it appears totals across these categories Fight Card When the Fight Card tab is selected, pairs of headshots appear with the last names of the fighters indicating each fight on the Fight Card, in reverse chronological order.

Between the fighters, the weight class of the fighters is indicated.

If the fight is currently live, a LIVE tag appears above the weight class indication.

If the fight is completed, the disposition of the fight (e.g., "SUB Guillotine Choke, R2, 1:27" or "S.DEC R3, 5:00") appears, and the winner of the fight is tagged If any fight is currently live when the Fight Card tab is selected, it is automatically selected.

At any time, any other bout on the Fight Card may be selected, which will then change the display of the Main Area to display the relevant information for that bout.

6. NHL

Event Tracking Area

The central area consists of a list of preceding game events at bottom and a central "Focus Area" that presents a graphical representation of plays above that.

The Focus Area is open by default. In can be closed by selecting the icon at the upper right of the area, and reopened by selecting any of the game event descriptions.

The major component of the Focus Area is a hockey rink graphic

Game events appear in real-time on the ice, color-coded by team

Game event graphics are tappable.

When selected, a mini-player card(s) appear(s), each showing the player's headshot, player number, name, and position.

For certain game events, an animation may play, illustrating the game event

Different game events types (Goals, Shots, Hits, Penalties, Fights, Blocks) will each have a unique graphical representation There is a limit to the number of game events graphically represented. Older plays appear progressively desaturated. When the maximum limit of plays able to be displayed is reached and a new play occurs, the graphical representation of the oldest of the plays disappears.

The current game event's description appears just below hockey rink, with game clock, short event description, and resultant score data appearing as appropriate Each play appears at the relevant point on the ice surface; when a new play appears, the preceding play's description moves below the Focus Area.

Focus Area Selectors

At top left of the Focus Area is a pull-down menu that allows the user to select what set of game events will be shown graphically on the rink: Last 10 (Live), All, All for Team 1, All for Team 2, or All by Period.

To the right of this selector is a series of buttons representing the six types of game events shown graphically on the rink. By default, all six are selected. Users can, however, toggle on and off the display of each of these six game event types individually.

Game DNA

Time as measured by the game clock forms the vertical axis of the area, in reverse chronological order. Lines are color-coded by team, and divided by periods.

Horizontal lines indicate shots attempted and goals scored.

Unique graphical tags also illustrate Hits, Penalties, Fights, and Blocks.

Each event is tap-able to bring up detail.

The "i" icon next to the title of the area provides detailed information as to the graphical representation below.

Stats

Three tabs appear Social/Stats modal at right, "On Ice," "Stats," and "Social." The highlight will default to the first tab the first time in, and subsequently to the last-highlighted tab.

On Ice displays a list of the current players on ice and in the penalty box for each team.

A button appears at the top of On Ice. When selected, it displays the current players on ice graphically on ice rink in the Focus Area.

When the Stats tab is selected in the Social/Stats modal at right, two subheaders appear, "Team Stats" and "Player Stats." The highlight will default to the first subhead the first time in, and subsequently to the last-highlighted subhead.

Team Stats displays the linescore (score by period) for the game at the top. The linescore will include any overtime(s), including multiple overtimes for playoffs or Shootouts for Regular Season.

Below the linescore, a color-coded selector displays labels for the two teams, the visiting team to the left and the home team to the right. The selector will default to the visiting team the first time in, and subsequently to the last-selected team.

Beneath the team selector team stats appear. The team selector allows the user to easily toggle between the teams to compare them in the various statistics provided.

The Player Stats subheader provides similar functionality. The team selector is repeated, and beneath it appear statistics related to each category: For Skaters—Goals, Assists, +/−, Shots on Goal, Time on Ice; for Goalies—Shots Faced, Goals Allowed, Saves, Save Percentage, Time on Ice, Penalty Minutes. Each section has separate column headers, then lists all players with qualifying statistics in that category.

7. NBA

Event Tracking Area

The central area consists of a list of preceding game events at bottom and a central "Focus Area" that presents a graphical representation of plays above that.

The Focus Area is open by default. In can be closed by selecting the icon at the upper right of the area, and reopened by selecting any of the game event descriptions.

The major component of the Focus Area is a basketball court graphic

Game events appear in real-time on the court, color-coded by team

Game event graphics are tap-able.

When selected, a mini-player card(s) appear(s), each showing the player's headshot, player number, name, and position.

For certain game events, an animation may play, illustrating the game event

Different game events types (Made Shots, Missed Shots, Steals, Fouls, Turnovers) will each have a unique graphical representation There is a limit to the number of game events graphically represented. Older plays appear progressively desaturated. When the maximum limit of plays able to be displayed is reached and a new play occurs, the graphical representation of the oldest of the plays disappears.

The current game event's description appears just below court, with game clock, short event description, full description, and resultant score data appearing as appropriate Each play appears at the relevant point on the court; when a new play appears, the preceding play's description moves below the Focus Area.

When the user employs the Point Differential slider to bring previous (i.e., non-current/live plays) into the Focus Area, additional element(s) appear Above the football field is a "FOX Box" that displays the period, time, score and timeouts remaining for each team. Note that this information pertains to the status of these data points immediately before the play currently displayed in the Focus Area. The header at the top of the screen, on the other hand, always shows the current, live status of these data points.

In addition, when and if individual play video highlights become available and a previous play appears in the Focus Area for which such a highlight is available, a thumbnail will appear next to the FOX Box. Selecting the thumbnail will cause the video highlight to play, after which the user will be returned to event tracking.

Focus Area Selectors

At top left of the Focus Area is a badge that reminds users they will always be shown Last 10 Events up to Live), unless the user has used the Point Differential slider to bring past game events to the Focus Area. In that situation, the badge would indicate only "Last 10."

Alternately, the user may choose simply to see the Shot Chart on the court, for any period of the game or all periods combined.

Point Differential (Game DNA)

Time forms the vertical axis of the area. Point differential is provided by the horizontal axis, in reverse chronological order.

Color-coded blocks indicate the point differential during each time segment of the game.

When the user presses anywhere on the timeline, a magnifying panel appears, which displays the game clock and score for that time in the game. The Focus Area displays the last 10 game events preceding that point on the timeline.

Stats

Three tabs appear Social/Stats modal at right, "On Court," "Stats," and "Social." The highlight will default to the first tab the first time in, and subsequently to the last-highlighted tab.

On Court displays a list of the current players on court for each team.

A button appears at the top of On Court. When selected, it displays the current players on court graphically on the court in the Focus Area.

When the Stats tab is selected in the Social/Stats modal at right, the linescore (score by period) for the game appears at the top. The linescore will include any overtime(s), including multiple overtimes, providing the ability to scroll if more periods are played than can be displayed at one time.

Below the linescore, a color-coded selector displays labels for the two teams, the visiting team to the left and the home team to the right. The selector will default to the visiting team the first time in, and subsequently to the last-selected team.

Beneath the team selector player stats appear. The team selector allows the user to easily toggle between the teams.

Statistics appear in separate areas for Starters and for Bench Players: Field Goals Made and Attempted, Three Pointers Made and Attempted, Free Throws Made and Attempted, Rebounds, Assists, and Total Points.

Each section has separate column headers, then lists all players with qualifying statistics in that category.

8. Soccer

Event Tracking Area

The central area consists of a list of preceding game events at bottom and a central "Focus Area" that presents a graphical representation of plays above that.

The Focus Area is open by default. In can be closed by selecting the icon at the upper right of the area, and reopened by selecting any of the game event descriptions.

The major component of the Focus Area is a soccer pitch graphic

Game events appear in real-time on the pitch, color-coded by team

Game event graphics are tap-able.

When selected, a mini-player card(s) appear(s), each showing the player's headshot, player number, name, and position.

For certain game events, an animation may play, illustrating the game event

Different game events types (Shots, Goals, Corners, Fouls, Cards) will each have a unique graphical representation There is a limit to the number of game events graphically represented. Older plays appear progressively desaturated. When the maximum limit of plays able to be displayed is reached and a new play occurs, the graphical representation of the oldest of the plays disappears.

The current game event's description appears just below the pitch, with game clock, short event description, full description, and resultant score data appearing as appropriate Each play appears at the relevant point on the pitch; when a new play appears, the preceding play's description moves below the Focus Area Shot Mode When a shot happens, the graphics switch from Field Mode to Goal Mode.

The ball is animated flying toward the goal, and either it misses, is blocked, or goes in.

Shootout Mode

Penalty shot panels are overlaid over the goalposts. The numbers on the headers are the total shootout count so far.

Before a player takes their shot, their name appears with a blank circle.

When a shot is taken, the panels move to the side to reveal Shot Mode.

After the shot, the panels return, with the result of each shot taken indicated graphically.

Focus Area Selectors

At top left of the Focus Area is a pull-down menu that allows the user to select what set of game events will be shown graphically on the rink: Last 10 (Live), All, All for Team 1, All for Team 2, or All by Period.

In concert with this select, the user may choose what game events to display for the selection made: Goals, Shots on Goal, Shots, and/or Fouls.

Match DNA

Time as measured by the game clock forms the vertical axis of the area, in reverse chronological order. Lines are color-coded by team, and divided by periods.

Horizontal lines indicate shots attempted and goals scored.

Unique graphical tags also illustrate Goals and Cards.

Each event is tapable to bring up detail.

The "i" icon next to the title of the area provides detailed information as to the graphical representation below.

Stats

Three tabs appear Social/Stats modal at right, "Lineup," "Stats," and "Social." The highlight will default to the first tab the first time in, and subsequently to the last-highlighted tab.

Lineup displays a list of the full team roster, broken down by On-Field and Subs.

Stats for each player are shown, including position, shots, and shots on goal.

Graphical decoration indicates those players with cards, who have scored, and who have been removed or entered the game.

A button appears at the top of Lineup. When selected, it displays the current players on court graphically on the pitch in the Focus Area.

When the Stats tab is selected in the Social/Stats modal at right, a side-by-side display of the two teams' collective stats appears.

Separate sections appear from Goals, Cards, and Substitutions.

Bar graphs illustrate other statistics, including possession, shots on goal, shots, saves, corner kicks, offsides, and fouls.

In other exemplary embodiments, a tab or other selectable operator is configured to turn on or off one or more of the plural interface portions. For example, a tab may provide for an event-tracking mode, which provides a score interface portion and an event tracking interface portion. The same or a different tab may provide for an overall event mode, wherein the statistics or social media interface portion and/or the DNA interface portion is additionally presented. In such a way, additional interface portions may be added to the display, providing discrete event modes with varying levels of presented detail and features. FIG. 1A illustrates a tab 32 that is configured to exit "game mode," resulting in the event-tracking mode described immediately above.

Other exemplary embodiments provide for other rich features, including rich animations, definitions of terms, officiating rules and/or historical video for custom topics, user requested topics, etc. Additionally, exemplary embodiments provide a 'companion' mode with, e.g., alternate camera angles, replay feeds, social media components, fantasy sport components, etc. Examples of such additional rich features are provided below:

Baseball

As the batter's count changes with each pitch, the system shows how the hitter's batting average, hot zones, and spray chart change. As runners advance, teams score, and outs are made, team win probabilities for each team change as well.

Football

As each play is completed, stat lines for the players involved automatically appear in the system—without cluttering the TV. With the new down-and-distance, the team's typical play call tendencies for that situation appear.

NASCAR

As each driver pits, the comparative times for those just ahead or just behind appear, along with comparisons of the work done. Viewers can compare this info in depth, while the television broadcast resumes its coverage.

When a racer is attempting to draft and then pass, the system presents historical video that shows how it can work—and another that illustrates how it can be thwarted.

Baseball

When the announcer observes the pitcher has a two-seam and four-seam fastball, the system provides side-by-side videos to show the differing rotations and movement.

Football

After the announcers refer to the "cover two" defense, an animation appears in the system to illustrate exactly what the cover two is, and when and how it is effective.

Additionally, the rich system contemplates social media, including viewing and posting relative to aggregated media streams, participation in chat rooms, etc.

In other exemplary embodiments, the system may offer or make available additional video or other content from a broadcast event, e.g., with video controls, social media sharing controls, etc. Such video could be alternative camera feeds, full field views, continuous replays from various cameras and angles, exclusive content specific to events, celebrity feeds and content, player or team matchup data, video analyses and interviews, vignettes, etc.

In exemplary embodiments, the system may be configured such that a producer creates a live experience contemporaneously with the event. Additionally, occurrences and topics from the game may automatically trigger suggestions of relevant data and media to a producer (e.g., at a producer dashboard), allowing the producer to review and publish such content as desired.

Figure 7:
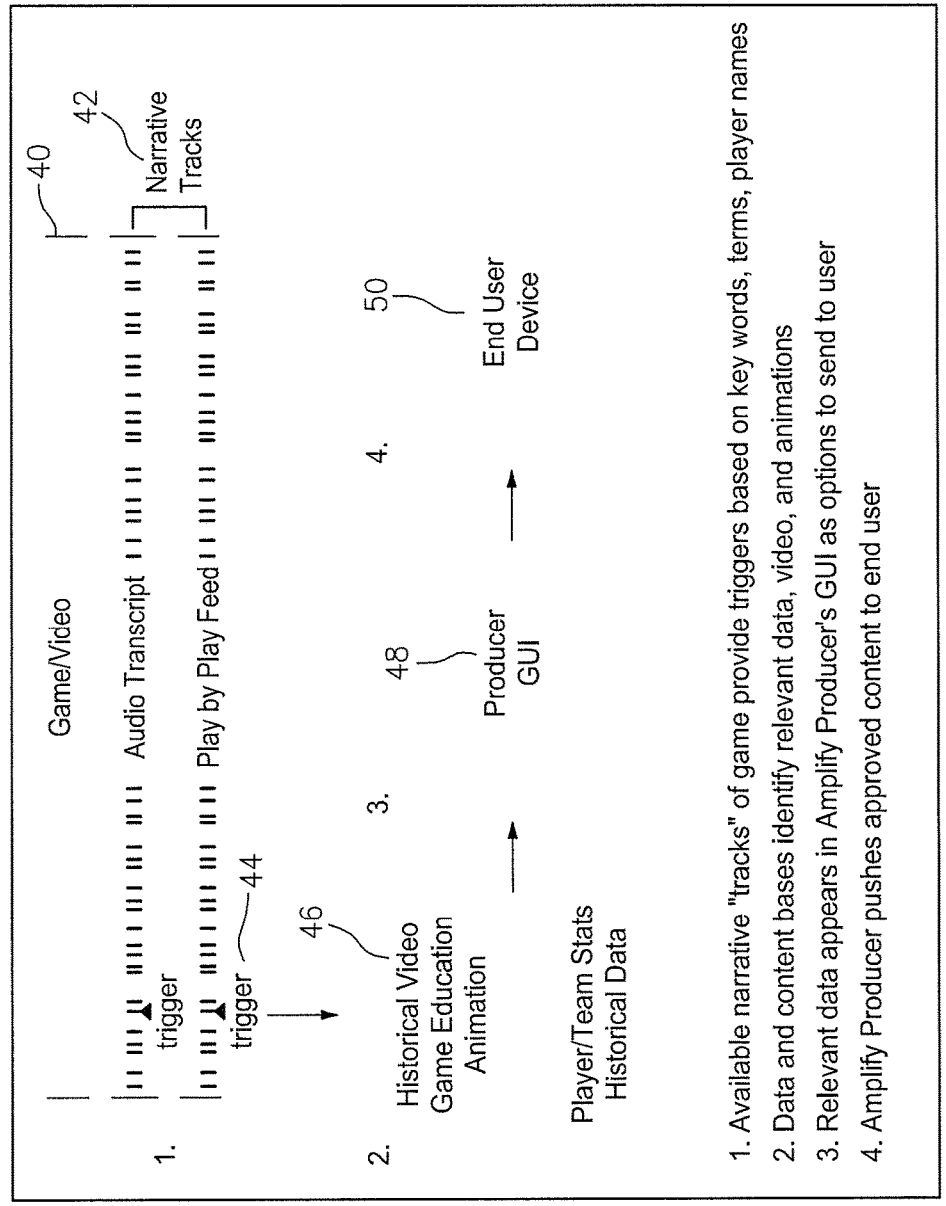
FIG. 7 is a flowchart of an exemplary publishing platform for a producer of rich content.

FIG. 7 illustrates an exemplary publishing platform, with reference to a game/video feed 40, narrative tracks 42, including triggers 44 therein prompting searches for relevant data, video, animation, explanation, etc. 46 provided to a producer GUI 48, which producer can push automatically recommended content or manually generated or located content to appropriate platforms (e.g., a PC, tablet, smartphone, etc.) 50.

In exemplary embodiments, available narrative "tracks" of a game provides triggers based on key words, terms, player names, etc. Data and content may be returned with relevant data, video and animations, which can be pushed by a producer to a user's interface.

Such may include a layer of automation providing framework for a producer. This level of automation provides a higher level of content selection, using real, or near real-time data to suggest a rich, highly relevant content to a producer, who cha choose to deliver to viewers in sync with the broadcast. Exemplary features include: use of technology configured to "listen" to play-by-play data and the announcer's audio, including references to players, drivers, formations, terms, etc., which can be extracted in real or near real-time; triggers by extraction of such references causing action via a content management system for relevant data, video, animation, explanation, etc.; return of relevant content to a producer's console, with subsequent selection of (automatically recommended) content by the producer. This, along with any manually chosen or searched for content can appear on the user's interface.

Other exemplary embodiments account for the size or profile of the event (e.g., the Super Bowl vs. a regular season game). In exemplary embodiments, the bigger the event, the more content available. In such cases, the system can expand to include whatever the broadcast group creates, or can drive a satisfying experience with no custom content. In fact, if no staff is available, the system can be set to drive the publishing directly and automatically (using its own recommendations). Also, the system can learn to be better at recommending content.

Figure 8:
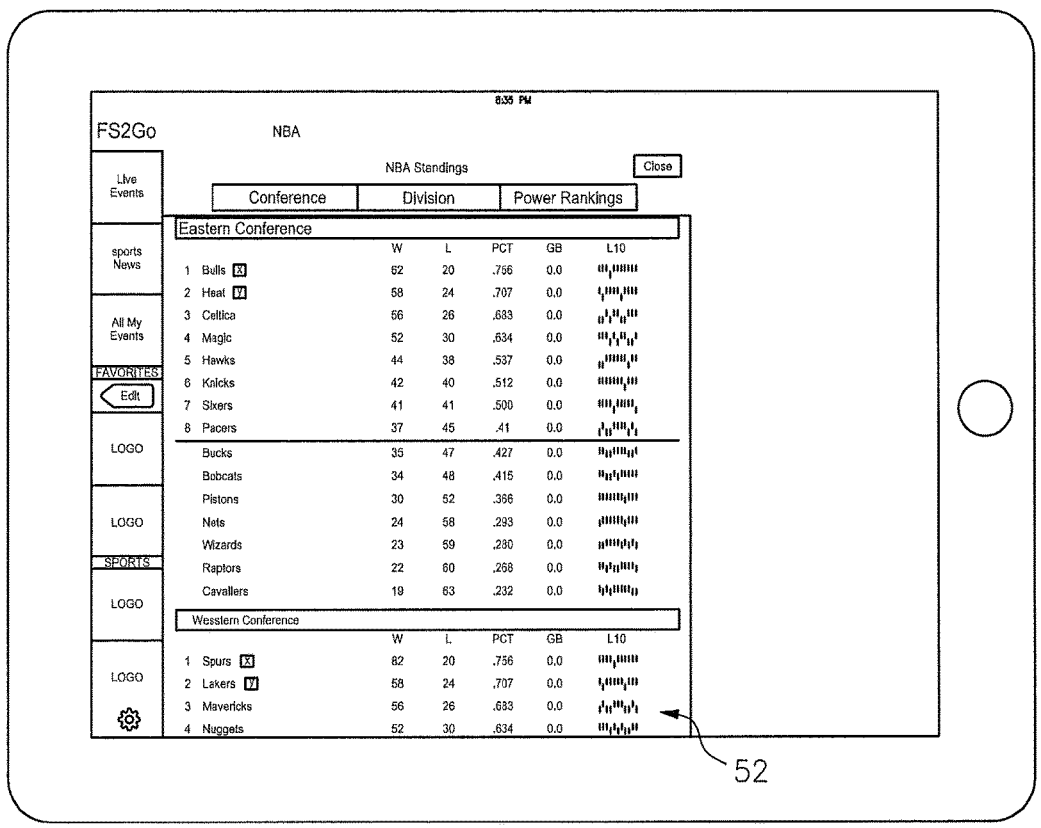
FIG. 8 is an exemplary statistics diagram with a visual representation of a team's last ten games.

Other exemplary embodiments provide a sporting event interface, with a representation of the last n games (e.g., 10 games) graphically within a standings table, allowing views of the result of each game, whether home or away, along with temporal interrelationships. FIG. 8 illustrates such a representation generally at 52.

Other exemplary embodiments provide a sporting event interface, with a selectable button within standings listings that yields a graphical display of each team's cumulative record, represented as games above or below "0.500." In exemplary embodiments, this graph can provide temporality to a season-long race between two teams.

Figure 9:
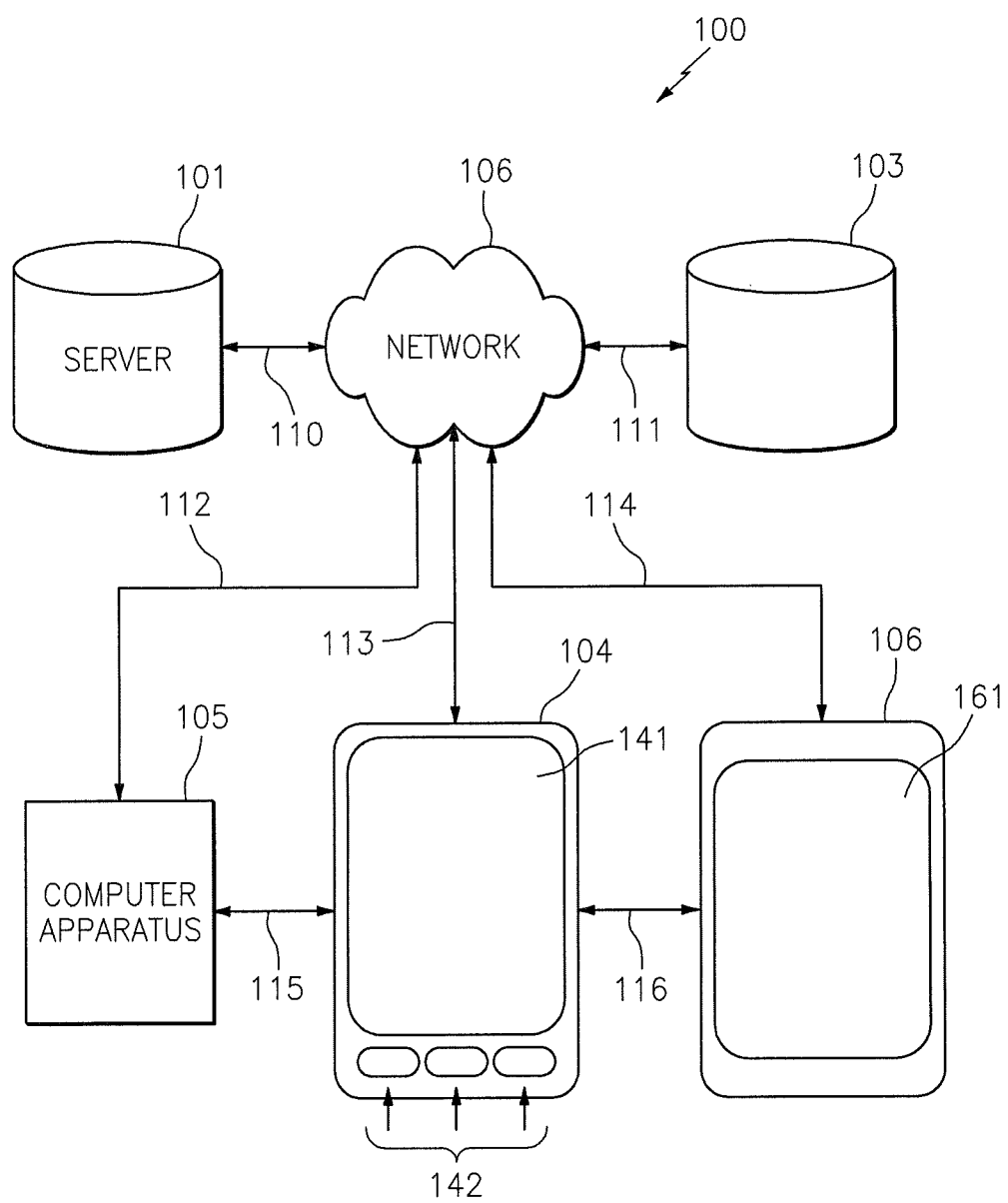
FIG. 9 is an exemplary system diagram in accordance with exemplary embodiments of the invention.

FIG. 9 illustrates an exemplary system for presenting event coverage. The system 100 may include a server 101. The server 101 may include a plurality of information, including but not limited to, profiles, non-gamer, e.g., viewer, information and profiles, data on current activity by gamers and viewers, data associating viewers and gamers into groups or social networks, additional social media information, advertisement information, algorithms and processing modules and other data storage. The server 101 may be in communication with a network 106 via a communication channel 110.

Additionally, the system 100 may access or interface with additional, third party data sources or servers 103. Third party sources of data 103 may be in communication with the network 106 via a communication channel 111. It is noted that although illustrated as separate, the source 103 may include a server substantially similar to server 101. The server 101 or source 103 may include a data service provider, for example, a cellular service provider, a business information provider, or any other suitable provider or repository. The server 101 or source 103 may also include an application server providing applications and/or computer executable code implementing any of the interfaces/methodologies described herein. The server 101 or source 103 may present a plurality of application defaults, choices, set-ups, and/or configurations such that a device may receive and process the application accordingly. The server 101 or source 103 may present any application on a viewer interface or web-browser of a device for relatively easy selection by a viewer of the device. The viewer interface or web-page rendered for application selection may be in the form of an application store and/or application marketplace.

Alternately, another server component or local computer apparatus, e.g., 104, 105 and/or 106, may produce the viewer interface and control connectivity to the server 101 or source 103. Also, the server 101 or one or more of the local computer apparatus 104, 105 and 106 may be configured to periodically access the source 103 and cache data relevant to data used in embodiments of the present invention.

The network 106 may be any suitable network, including the Internet, wide area network, and/or a local network. The server 101 and the source 103 may be in communication with the network 106 over communication channels 110, 111. The communication channels 110, 111 may be any suitable communication channels including wireless, satellite, wired, or otherwise.

An exemplary system 100 further includes computer apparatus 105 in communication with the network 106, over communication channel 112. The computer apparatus 105 may be any suitable computer apparatus including a personal computer (fixed location), a laptop or portable computer, a personal digital assistant, a cellular telephone, a portable tablet computer, a portable audio player, or otherwise. For example, the system 100 may include computer apparatuses 104 and 106, which are embodied as a portable cellular telephone and a tablet, respectively. The apparatuses 104 and 106 may include display means 141, 161, and/or buttons/controls 142. The controls 142 may operate independently or in combination with any of the controls noted above.

Further, the apparatuses 104, 105, and 106 may be in communication with each other over communication channels 115, 116 (for example, wired, wireless, Bluetooth channels, etc); and may further be in communication with the network 106 over communication channels 112, 113, and 114.

Therefore, the apparatuses 104, 105, and 106 may all be in communication with one or both of the server 101 and the source 103, as well as each other. Each of the apparatuses may be in severable communication with the network 106 and each other, such that the apparatuses 104, 105, and 106 may be operated without constant communication with the network 106 (e.g., using data connection controls of an interface). For example, if there is no data availability or if a viewer directs an apparatus to work offline, the data used by any of the apparatuses 104, 105, and 106 may be based on stored or cached information/parameters. It follows that each of the apparatuses 104, 105, and 106 may be configured to perform the methodologies described in the various exemplary embodiments.

Furthermore, using any of the illustrated communication mediums, the apparatuses 104, 105, and 106 may manipulate, share, transmit, and/or receive different data previously or currently produced at any one of the illustrated elements of the system 100. For example, data may be available on the server 101 and/or the source 103. Moreover, viewers of any of the devices 104, 105, and 106 may independently manipulate, transmit, etc., data, e.g., to separately determine a current value of the index at a given time.

Figure 10:
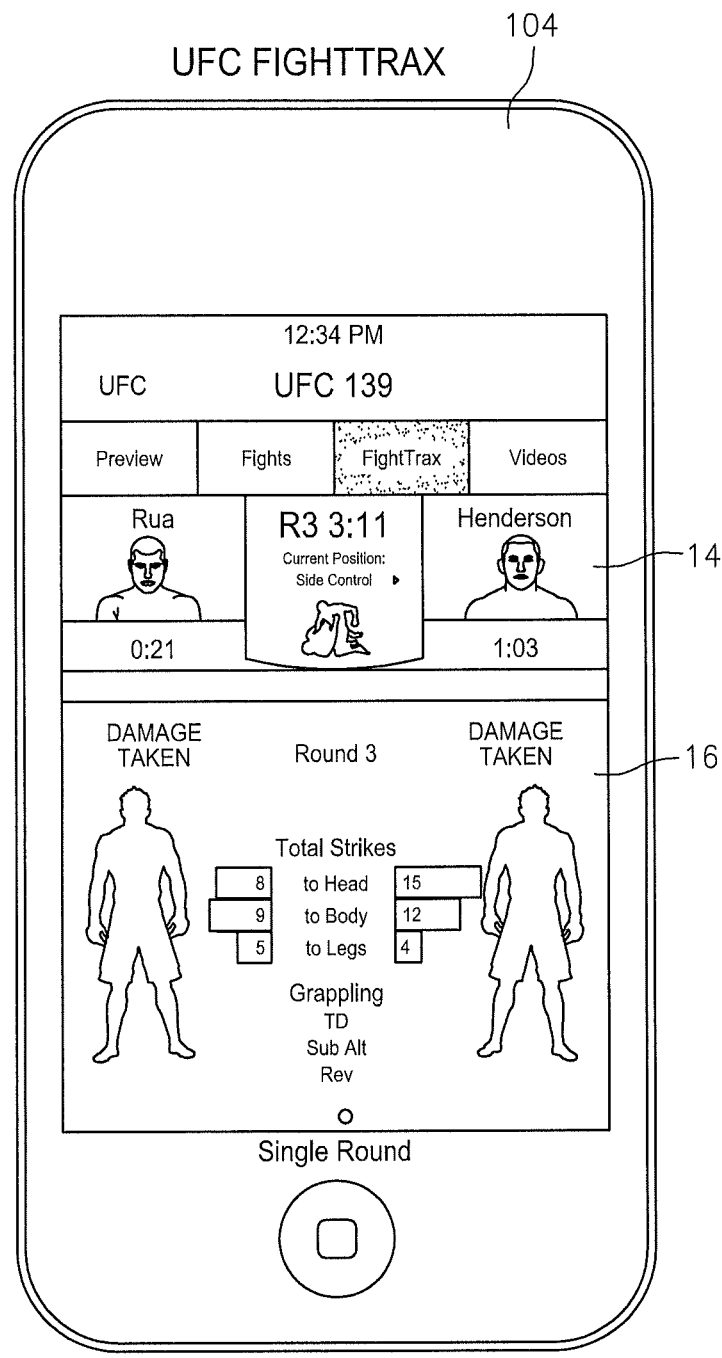
FIG. 10 is an illustration of an exemplary smartphone viewer interface.

Referring now to FIG. 10, an exemplary mobile smartphone 104 illustrates a mobile user interface having a mobile presentation in accordance with the present invention. The illustrated exemplary mobile presentation of the event includes plural concurrent interfaces 14, 16 and detailed information regarding the event. Such an interface may include use of gestures, e.g., swipe, to show additional data. In an exemplary embodiment, a swipe on a top section (e.g., showing fighters at 14), allow viewing of other fights, or at 16, for allowing viewing of different pages showing statistics for different rounds, periods, etc. Also, as with other interfaces, in this case, strikes will show up on the body of the fighter (or other equivalents between sports) as a flash (with varying intensity or size dependent upon damage taken or number of hits)

In accordance with certain of the described exemplary embodiments, the present invention advantageously creates an environment wherein viewers are incentivized to watch more of (or the entire) event given the richer environment provided by the plural concurrent interfaces. Additionally, certain interfaces may also include advertisement space, with advertisements served to users as a further source of revenue realized from the rich user experience. Any interface contemplates such advertisements, including website interfaces, dedicated application interfaces, mobile device interfaces, broadcasted interfaces and interfaces at physical locations. Additionally, exemplary embodiments contemplate dedication of some or all of the advertisements to sponsors (e.g., a sponsor may take over the brand experience for an entire production or particular game or event).

Additionally, example embodiments of the invention may be embodied in the form of computer-implemented processes and apparatuses for practicing those processes. Therefore, according to an example embodiment, the methodologies described hereinbefore may be implemented by a computer system or apparatus. A computer system or apparatus may be somewhat similar to the mobile devices and computer apparatuses described above, which may include elements as described below.

Figure 11:
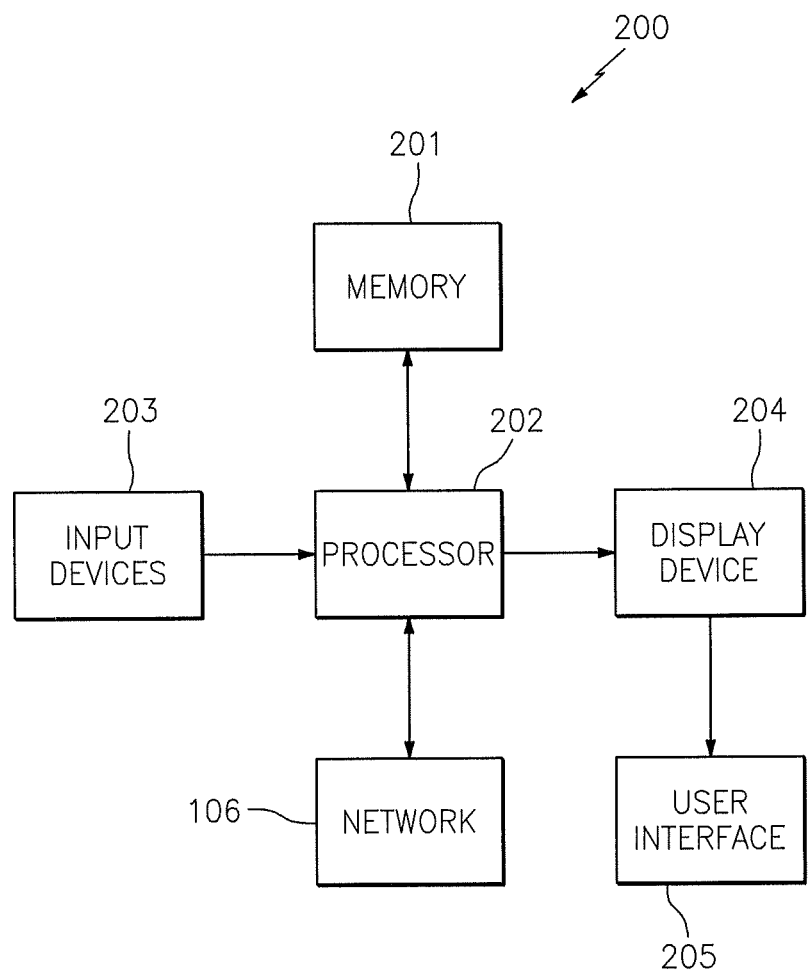
FIG. 11 is an exemplary computer system diagram.

FIG. 11 illustrates a computer apparatus, according to an exemplary embodiment. Portions or the entirety of the methodologies described herein may be executed as instructions in a processor 202 of the computer system 200. The computer system 200 includes memory 201 for storage of instructions and information, input device(s) 203 for computer communication, and display device 204, which may display a user interface 205. The computer system 200 may further be connected to the network 106.

Thus, the present invention may be implemented, in software, for example, as any suitable computer program on a computer system somewhat similar to computer system 200. For example, a program in accordance with the present invention may be a computer program product causing a computer to execute the example methods described herein.

Figure 12:
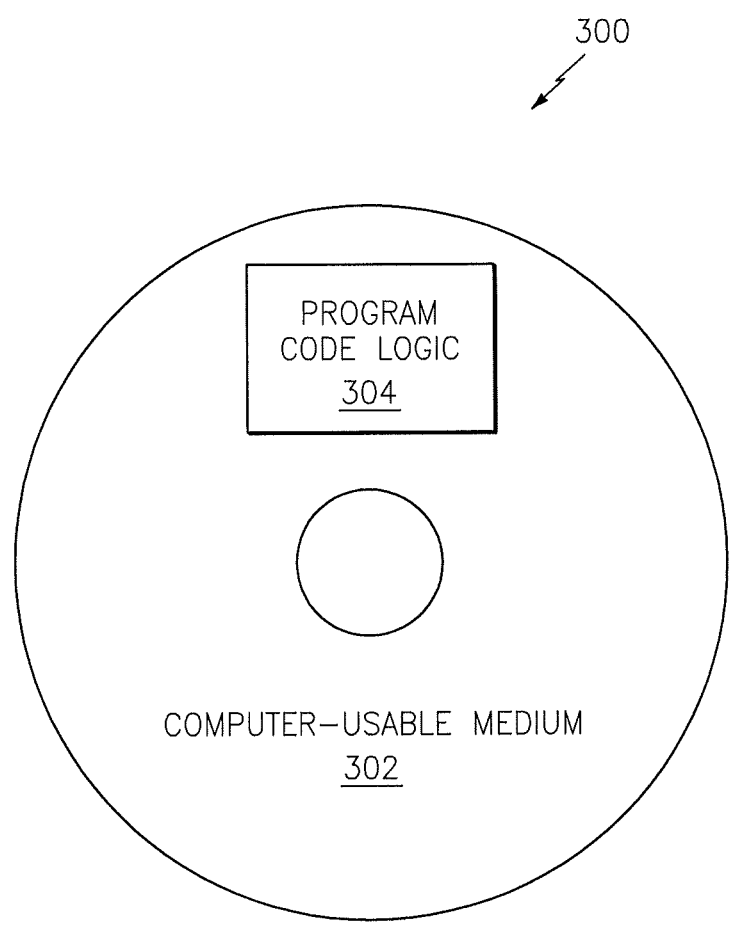
FIG. 12 is an exemplary computer-usable medium in accordance with exemplary embodiments described herein.

Therefore, embodiments can be embodied in the form of computer-implemented processes and apparatuses for practicing those processes on a computer program product. Embodiments include the computer program product 300 as depicted in FIG. 12 on a computer usable medium 302 with computer program code logic 304 containing instructions embodied in tangible media as an article of manufacture. Exemplary articles of manufacture for computer usable medium 302 may include floppy diskettes, CD-ROMs, hard drives, universal serial bus (USB) flash drives, or any other computer-readable storage medium, wherein, when the computer program code logic 304 is loaded into and executed by a computer, the computer becomes an apparatus for practicing the invention. Embodiments include computer program code logic 304, for example, whether stored in a storage medium, loaded into and/or executed by a computer, or transmitted over some transmission medium, such as over electrical wiring or cabling, through fiber optics, or via electromagnetic radiation, wherein, when the computer program code logic 304 is loaded into and executed by a computer, the computer becomes an apparatus for practicing the invention. When implemented on a general-purpose microprocessor, the computer program code logic 304 segments configure the microprocessor to create specific logic circuits.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the viewer's computer, partly on the viewer's computer, as a stand-alone software package, partly on the viewer's computer and partly on a remote computer or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

As described above, features of example embodiments include and other unique features not found in the conventional art. It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiment(s) of the invention without departing from the spirit and scope of the invention. Accordingly, various different indexes may be generated as desired in accordance with exemplary embodiments disclosed herein. All such modifications and variations are intended to be included herein within the scope of this disclosure and the present invention and protected by the following claims.

The invention claimed is:

1. A system for presenting event coverage using plural concurrent interface portions, comprising:
   a user display, configured with plural concurrent interface portions, each interface portion including different classes of event information, wherein each interface portion is provided by a processor that is configure to deliver and update information related to a live sporting event; and
   wherein said user display includes a high-level chronology-based interface portion comprises a time-line representing a higher level of all or a subset of discrete occurrences of the event along an axis, with discrete events represented along said axis represented by graphical or symbolic indicators of said discrete occurrences, and further wherein each discrete event represented along said axis is presented at a distance away from said axis based on the relative significance of actions of the sporting event with plural discrete events being represented at different distances away from said axis.

2. A system in accordance with claim 1, wherein said user display includes two or more of: a statistics or social media interface portion; a score interface portion; an event tracking interface portion; and a high-level chronology-based interface portion.

3. A system in accordance with claim 1, wherein said user display includes a statistics or social media interface portion that is configured to alternately provide access to statistics for the event and access to aggregated social media streams pertaining to the event.

4. A system in accordance with claim 3, wherein said user display provides tabs or other selectable operators allowing a user to switch viewing modes.

5. A system in accordance with claim 3, wherein said social media interface is configured to permit a user to select social media sources and to post comments within one or more streams.

6. A system in accordance with claim 1, wherein said user display includes a score interface portion that is configured to provide status information for the event.

7. A system in accordance with claim 6, wherein said scoring interface includes two or more of: event timing, inning indicator, teams or combatants and scoring.

8. A system in accordance with claim 1, wherein said user display includes an event tracking interface portion that is configured to provide visualization of the event's discrete occurrences.

9. A system in accordance with claim 8, wherein said visualization is text-based.

10. A system in accordance with claim 8, wherein said event tracking interface is configured to provide a user the ability to move in a bi-directional way through a time sequence of occurrences.

11. A system in accordance with claim 1, wherein said visualization is image based or animated.

12. A system in accordance with claim 1, wherein said high-level chronology-based interface portion provides a representations of a baseball game, with said plural discrete events representative of two or more of: an out at bat; batter advancement to first base; batter advancement to second base; batter advancement to third base; batter advancement to home; batter's total progression; a hit; advancement to a base on a ball; and advancement to a base after a hit.

13. A system in accordance with claim 1, wherein said user display includes a tab or other selectable operator that is configured to turn on or off one or more of the plural interface portions.

14. A system in accordance with claim 13, wherein said tab or other selectable operator provides for an event-tracking mode, which provides a score interface portion and an event tracking interface portion.

15. A system in accordance with claim 13, wherein said tab or other selectable operator provides for an overall event mode, wherein the statistics or social media interface portion and the high-level chronology-based interface portion are presented along with a score interface portion and an event tracking interface portion.

16. A system in accordance with claim 1, further comprising a supplemental user interface providing additional rich features, including two or more of: rich animations, definitions of terms, officiating rules, historical video for custom topics, user requested topics, alternate camera angles, replay feeds, social media components, and fantasy sport components.

17. A system in accordance with claim 16, wherein said supplemental user interface with additional rich features is provided by a producer GUI, provided on a publishing platform, wherein the platform is configured such that a producer creates a live experience contemporaneously with the event.

18. A system in accordance with claim 17, wherein occurrences and topics from the event automatically trigger suggestions of data and media to said producer at a producer GUI, allowing the producer to review and publish such data and media.

19. A system in accordance with claim 1, further comprising an interface configured to provide statistics with a representation of the last n games graphically within a standings table, allowing views of the result of each game along with temporal interrelationships.

20. A system in accordance with claim 1, further comprising an interface configured to provide selectable button within standings listings that yields a graphical display of each team's cumulative record, represented as games above or below 0.500.

21. A system in accordance with claim 1, wherein said high-level chronology-based interface portion comprises color coding for said graphical or symbolic indicators, said color coding further used to specify an aspect of said discrete occurrences.

22. A system in accordance with claim 1, wherein said high-level chronology-based interface portion presents images or video related to said discrete occurrences along said timeline.

23. A system in accordance with claim 1, wherein said discrete occurrences are presented on axes perpendicular to the axis representing said timeline.

24. A system in accordance with claim 1, farther comprising a scrolling aspect configured to scroll via user input the timeline of said high-level chronology based interface portion.

25. A system in accordance with claim 1, wherein said high-level chronology-based interface portion comprises text for said graphical indicators, said text farther used along with said graphical or symbolic indicators to specify an aspect of said discrete occurrences.

26. A system in accordance with claim 1, wherein said high-level chronology-based interface portion provides a representations of a fighting match, with said plural discrete events representative of two or more of: one strike; two strikes; three strikes; four or more strikes; a knockdown; and a takedown.

27. A system in accordance with claim 1, wherein said high-level chronology-based interface portion provides a representations of a hockey game, with said plural discrete events representative of two or more of: number of shots attempted; goals; hits; penalties; fights; and blocks.

28. A system in accordance with claim 1, wherein said high-level chronology-based interface portion provides a representations of a football or basketball game, with said plural discrete events representative of point lead and relative point differential.

29. A method for presenting event coverage using plural concurrent interface portions, comprising:
providing at a user display, plural concurrent interface portions, each interface portion including different classes of event information, wherein each interface portion is provided by a processor that is configure to deliver and update information related to a live sporting event, wherein said user display includes a high-level chronology-based interface portion comprises a timeline representing a higher level of all or a subset of discrete occurrences of the event along an axis, with discrete events represented along said axis represented by graphical or symbolic indicators of said discrete occurrences, and further wherein each discrete event represented along said axis is presented at a distance away from said axis based on the relative significance of actions of the sporting event with plural discrete events being represented at different distances away from said axis.

30. An interface for presenting event coverage using plural concurrent interface portions, comprising:

a user display, configured with plural concurrent interface portions, each interface portion including different classes of event information, wherein each interface portion is provided by a processor that is configure to deliver and update information related to a live sporting event, wherein said user display includes a high-level chronology-based interface portion comprises a timeline representing a higher level of all or a subset of discrete occurrences of the event along an axis, with discrete events represented along said axis represented by graphical or symbolic indicators of said discrete occurrences, and further wherein each discrete event represented along said axis is presented at a distance away from said axis based on the relative significance of actions of the sporting event with plural discrete events being represented at different distances away from said axis.

* * * * *